United States Patent

Cicatelli

[15] 3,669,455

[45] June 13, 1972

[54] TAPE RECORDING DEVICE

[72] Inventor: Rodolfo Cicatelli, Roma, Italy

[73] Assignee: Antovox S.p.A., Rome, Italy

[22] Filed: March 3, 1969

[21] Appl. No.: 803,692

[30] Foreign Application Priority Data

Oct. 9, 1968 Italy ................................40334 A/68

[52] U.S. Cl. ........................274/4 E, 179/100.2 Z, 242/201, 242/198, 242/204, 274/4 D

[51] Int. Cl.....................................G11b 15/20, G11b 15/24

[58] Field of Search....................274/4 D, 11 D, 4 C, 11 C, 4; 179/100.2 Z; 242/201, 204, 197–200, 206–209

[56] References Cited

UNITED STATES PATENTS

| | | | |
|---|---|---|---|
| 3,317,212 | 5/1967 | Tatter | 274/4 F |
| 3,085,758 | 4/1963 | Herrmann et al. | 242/201 |
| 3,093,335 | 6/1963 | Lane | 242/204 |
| 3,475,563 | 10/1969 | Papst | 179/100.2 Z |
| 3,460,733 | 8/1969 | Lane | 242/197 |
| 3,485,500 | 12/1969 | Loeschner | 274/11 B |
| 3,492,005 | 1/1970 | Ueno | 274/4 B |
| 3,495,835 | 2/1970 | Laa | 274/4 |

*Primary Examiner*—Leonard Forman

*Assistant Examiner*—Dennis A. Dearing

*Attorney*—Hofgren, Wegner, Allen, Stellman & McCord

[57] ABSTRACT

The tape recording device comprises a mechanism wherein the change from one speed mode to another is controlled by a single connecting plate, which is in turn actuated by an assembly which also governs the cassette slip-in, cassette positioning and ejecting units.

12 Claims, 13 Drawing Figures

Inventor:
Rudolfo Cicatelli
By Hofgren, Wegner, Allen, Stellman & McCord
Attys

TAPE RECORDING DEVICE

The present invention relates to the field of cassette recorders, i.e., magnetic recorders using magnetic tape cassettes, and it particularly relates to the tape transport mechanism, the speed mode controls and the cassette positioning units of such recording devices. It is an object of my present invention to supply a magnetic recorder using tape cassettes, wherein the start, stop, slow forward, fast forward and fast rewind speed modes are effected by a single control assembly.

It is a further object of my invention to supply a recorder of the above description, wherein the motion of the reproduce, record and erase heads and of the pressure roller towards and away from the tape is controlled concomitantly by the same control.

It is an additional object of my invention to supply a recorder wherein the slip-in, the correct positioning and finally the ejection of the cassette is effected by the actuation of the above-mentioned control assembly, stops being provided to block the control when no cassette is placed in the recorder.

It is a still further object of my invention to supply a recorder having a transmission which is simpler and more efficient than those hitherto known.

These and other objects and advantages of my invention will result clearly from the following description, made with reference to the attached drawings, of one of its possible embodiments, it being understood that said description has to be construed as being purely illustrative and in no way limitative to my invention. In the following disclosure and claims, the directions "right," "left," "clockwise" and "counterclockwise," "top," "bottom" etc. are intended as they appear to the beholder of the figures being discussed.

IN THE DRAWINGS

Figure 1:
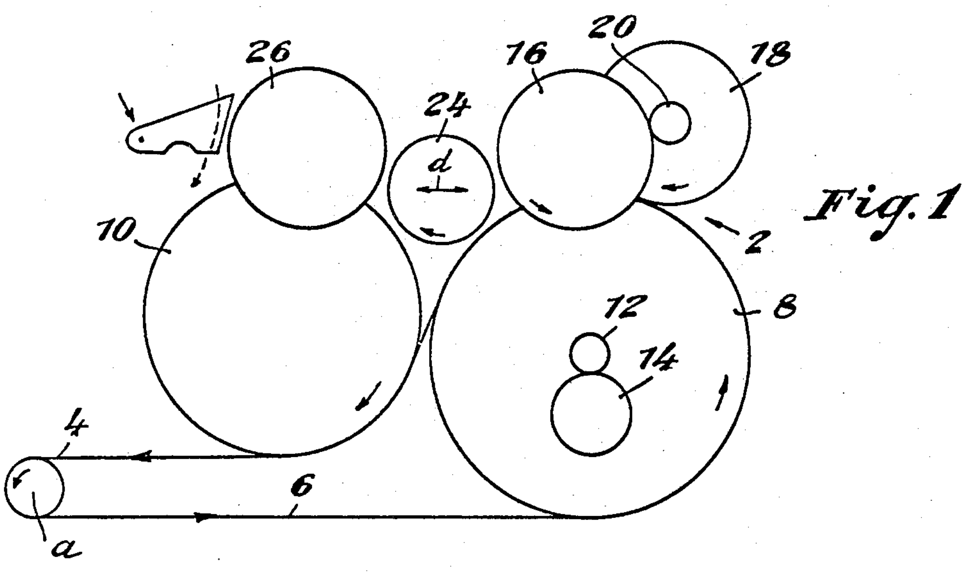
FIG. 1 is a schematic view showing the tape transport mechanism of the embodiment being here illustrated.

With reference to the figures, wherein the same parts are indicated by the same reference numerals, the tape transport mechanism, generally indicated at 2, is driven by a pulley 4 rotated by an electric motor (not shown) in a single sense of rotation. The endless elastic cord 6, transmitting the drive from the pulley 4 to the tape transport mechanism is caused to surround the greater part of the circumference of a flywheel 8 owing to the provision of an idler wheel 10, which is driven by said cord in the opposite sense of rotation and is therefore used for the obtainment of the rewind speed mode. The resulting senses of rotation of the pulley, flywheel and idler are indicated by the arrows.

The capston 12 is formed by the projection of the flywheel shaft, and the magnetic tape is pressed upon it by the pressure roller 14, whose mount will be described later.

Figure 3:
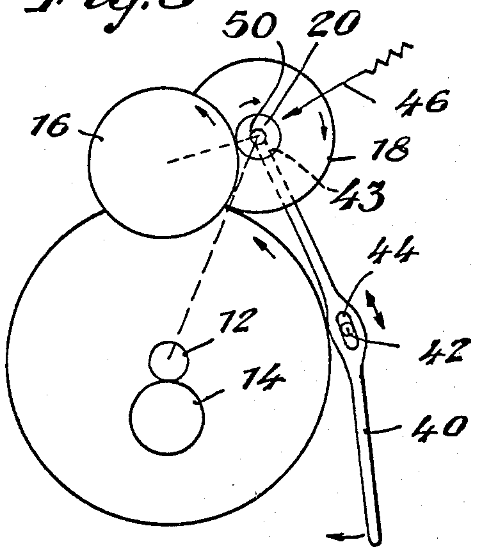
FIG. 3 is another partial view thereof.

When the tape transport mechanism is set for the slow forward mode, for tape playback or recording, the transmission wheel 18, which is supported at one end of an oscillatable lever 40 (FIGS. 3, 5, and 6) is pressed with the rim against the rim of the flywheel 8. Pinion 20, which is frictionally coupled to and concentric with wheel 18, engages simultaneously the disc 16 which drives the tape-receiving reel (not shown). Thus the slow forward drive is transmitted from flywheel 8 to disc 16 by the wheel couple 18–20.

The flip-over wheel 24 serves, as known, to switch the speed mode from fast forward to fast rewind.

Figures 2, 4:
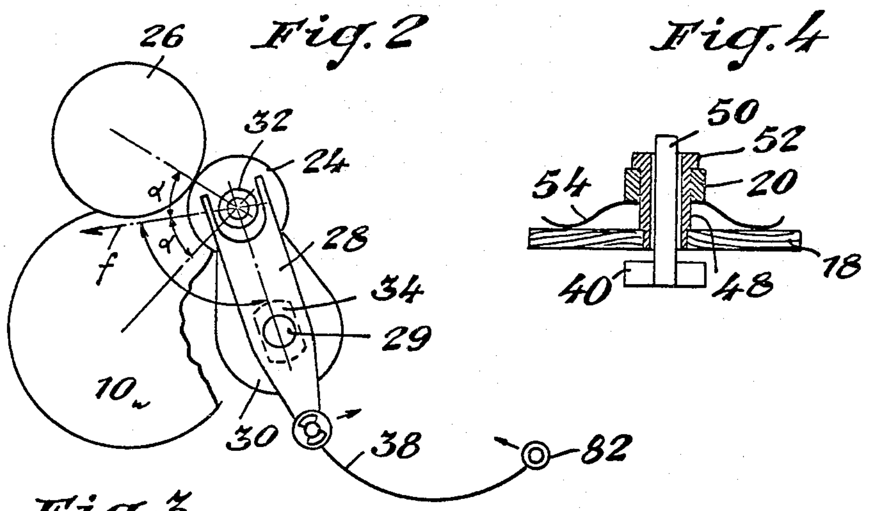
FIG. 2 is an enlarged partial view thereof.
FIG. 4 is an enlarged sectional view of a friction clutch used in said mechanism.

For the purposes of a perfect transmission of motion from idler 10 to disc 26 or from flywheel 8 to disc 16 for the fast rewind or fast forward mode respectively, the flip-over wheel 24 must be mounted with a certain degree of freedom in its support, so as to adjust itself in the cuspidal space formed by each wheel couple and to engage their rims with an identical pressure. As shown in FIG. 2, this purpose is attained optimally when the directrix of the pressure f exerted upon wheel 24 by its mount passes through its center, and coincides with the bisectrix of the angle $2\alpha$ formed by the dotted lines connecting the center of wheel 24 with the centers of wheels 10 and 26 or 8 and 16 respectively. In the known devices, this requirement was met by mounting the flip-over wheel at the free end of an arm, whose other end was pivoted to the end of another oscillatable arm.

In the improved solution forming part of this invention, the wheel 24 is movable lengthwise within its oscillatable mount. The mount shown in FIG. 2 consists of an arm 28 which is pivoted at 29 to the frame of the cassette player. The wheel 24 is mounted at one end of a support 30, with the projecting portion of the wheel shaft supported in a bushing 32. The wheel-carrying end of support 30 is guided by the bushing 32 within the two prongs of a fork formed at the corresponding end of arm 28, while the other end of support 30 is guided by pivot 29 which is engaged within a slot 34 of support 30. Thus the wheel 24, together with the support 30, being movable lengthwise relatively to arm 28 and simultaneously oscillatable with the latter, possesses the necessary 2° of freedom for an optimum drive transmission, although it is prevented by its mount from moving perpendicularly to the wheel plane or at an inclination with respect to it.

A spring 38 connects the unforked end of arm 28 with a pivot 82 of the speed mode control, as it will be illustrated with reference to FIGS. 5 and 6.

For the same reasons, the assembly transmitting the motion from wheel 8 to wheel 16 and comprising the wheels 18 and 20, is mounted at the end of an arm 40, which is capable of performing simultaneously pivotments and longitudinal movements since its pivot 42 is guided within a slot 44 provided in said arm. A spring 46 biases the assembly 18, 20 against the wheels 16 and 18, the force exerted by said spring passing through the wheel centers.

As known, during the flow forward speed mode, the magnetic tape (not shown) is fed at a constant speed between capston 12 and pressure roller 14 to the take-up reel inserted on disc 16. On the other hand, if the speed of disc 16 were kept constant, the speed of the tape would increase with the increasing diameter of the tape roll which is being formed in the take-up reel. This would result in an undue stress upon the tape between the capstan and reel, and on the mechanism in general.

The problem of minimizing this stress has been hitherto solved in various ways, such as by frictional couplings. The novel frictional coupling adopted in the present invention consists in the already mentioned wheel 18, whose hub, bushing 48, is freely rotatable around a pin 50 projecting from end 43 of the arm 40. Pinion 20 is slidable in bushing 48 and abuts against a collar 52 of hub 48, and thus presses, through a resilient spider 54, which is rigid with it, upon the upper surface of wheel 18. The just described frictional coupling differs from the known ones because the pinion 20 has no interaction with the pivot pin 50, or with the frame of the mechanism in general, but merely with wheel 18.

Figure 7:
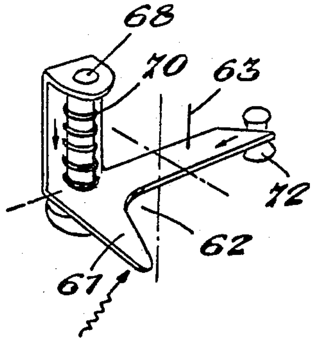
FIG. 7 is a perspective view of the reproduce head mount.
Figure 5:
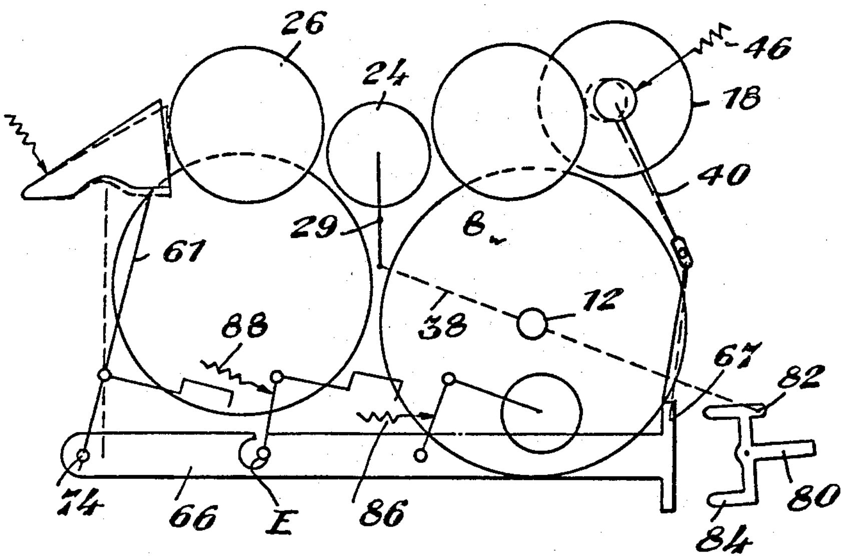
FIG. 5 is a diagrammatic view of the tape transport mechanism and its controls in a stop condition.
Figure 6:
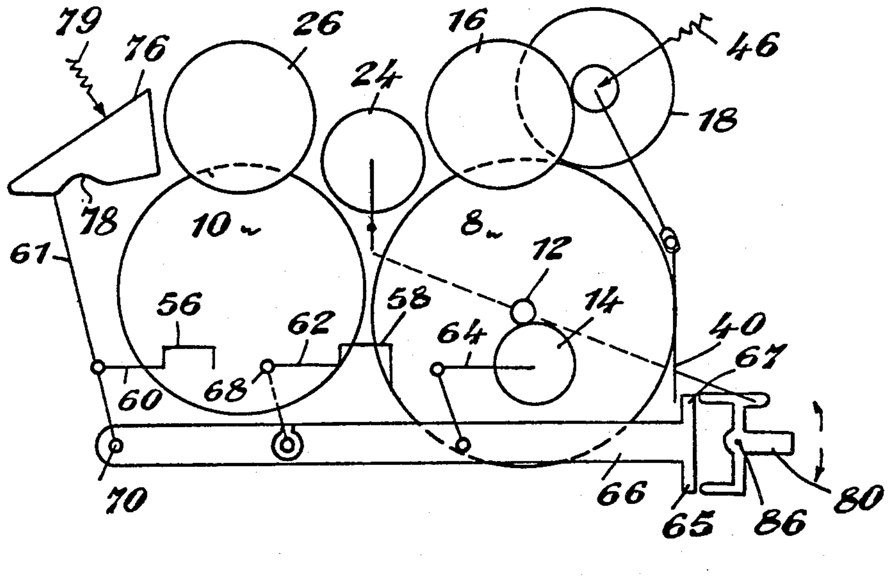
FIG. 6 is a similar view with the mechanism and its controls in the slow forward speed mode.

The controls and the actuation of the magnetic heads and pressure roller are illustrated in FIGS. 5, 6 and 7.

The erase head 56, the reproduce head 58 and the pressure roller 14 are mounted each at one end of a bell crank lever 60, 62 and 64 respectively, whose apexes are fulcrumed in the base plate of the mechanism. Levers 60 and 64 are pivoted with their other ends to a connecting rod or plate 66. Since the distance between tape and reproduce or record head is critical, to ensure the exact positioning under all circumstances and independently of possible constructional inaccuracies, the end of the free arm of lever 62 engages with a clearance within a cut E of connecting rod 66. This arrangement permits the lever a certain amount of movement independent of said connecting rod.

The arrangement for accurately positioning the reproduce and/or recording head is shown in greater detail in the enlarged view of FIG. 7. The lever 62 is fulcrumed at 68 and biased against the base by a spring 70, so as to tend to rotate in a horizontal plane. Its arm 61 is engaged, as stated, in cut E. Its other arm, which supports the reproduce or record head, is pressed by spring force, with its wedge-shaped end, against the innermost portion of a biconical throat of a pin 72 fastened to the base plate, thereby eliminating the possibility of vertical oscillations. The wedge-shaped end will compensate any tolerances in the direction of the tape motion, in other words, it will prevent the magnetic head from longitudinal movements along the tape.

The connecting plate 66 is slidable lengthwise on the base plate. In the stop position of the transport mechanism, as represented in FIG. 5, the connecting plate 66 is drawn back to the left, and consequently the magnetic heads 56 and 58, as well as the pressure roller 14 are in their retracted position, away from the tape. Simultaneously a projection 67 at the right end of the connecting plate holds, over arm 40, the wheel pair 18, 20 withdrawn from wheels 8 and 16, while an extension 61 of the bell crank lever 60 keeps a brake 76 detached from wheel 26. The flip-over wheel is in its central, inoperative position.

In the playback mode, the connecting plate 66 is shifted to the right, within the reach of the prongs or cams of a fork 80. The position of the components during this mode is shown in FIG. 6. The magnetic heads and the pressure roller accost the tape. Arm 40 is disengaged from the lug 67 and thereby the wheel pair 18-20, under the action of spring 46, transmits the slow motion from wheel 8 to wheel 16. Extension 61 has rotated anticlockwise, thereby travelling through the negative cam profile 78, during which stage a spring 79 has briefly pressed the brake 76 against wheel 26, (as shown in dotted outlines in FIG. 5) and thereafter detached the brake again from said wheel. The flip-over wheel, which is connected by its resilient link 38 to the prong 82 of a fork 80, is in its inoperative position.

In order to switch from the slow forward to the fast forward or fast rewind mode, fork 80 is rotated anticlockwise or clockwise respectively around its fulcrum 87, as indicated by the arrows in FIG. 6. This rotation will flip the mount of wheel 24 around its pivot 29 to obtain one of these modes. Simultaneously, the lug 67 will engage the arm 40 thereby disconnecting the slow forward drive.

Independently of the sense of rotation of fork 80, one of its prongs or came 82 or 84 will cause the connecting plate 66 to travel a short stretch backward by pressing against a corresponding lug 67 or 65 respectively provided at the adjacent forked ends of said plate. These short displacements are sufficient to slightly detach the magnetic heads and the pressure roller from the tape during the fast speed modes.

During the transition from the fast forward to the slow forward mode, the inertia of the payout reel placed on the disc 26, which remains free during this transition, would cause the tape to form an undesirable loop or slack between said disc and the capstan. This is prevented by the brief contact of brake 76 upon wheel 26 caused by the short penetration of the lever extension 61 into the negative cam 78, while the fork 80 is reverting into its neutral position shown in FIGS. 5 and 6.

Thus, the three speed modes, the corresponding movements of the magnetic heads and of the pressure roller as well as the necessary braking of wheel 26 are controlled by the fork 80 and the connecting plate 66.

The interaction and linkage between an actuator and these two components 66 and 80 on one hand and said actuator and the automatic cassette slip-in, positioning and ejection units on the other hand, in order to attain a one-knob control of all these operations will be explained in the following, with reference to FIGS. 8 and 9, wherein, for better clarity, all elements not necessary for the explanation are omitted.

The connecting plate 66 is urged to the right, i.e., to the position shown in FIG. 6, by the force of the springs 86 and 88 (FIG. 5) which tend to swing the bell crank levers in a counterclockwise rotation around their fulcrums.

Figure 8:
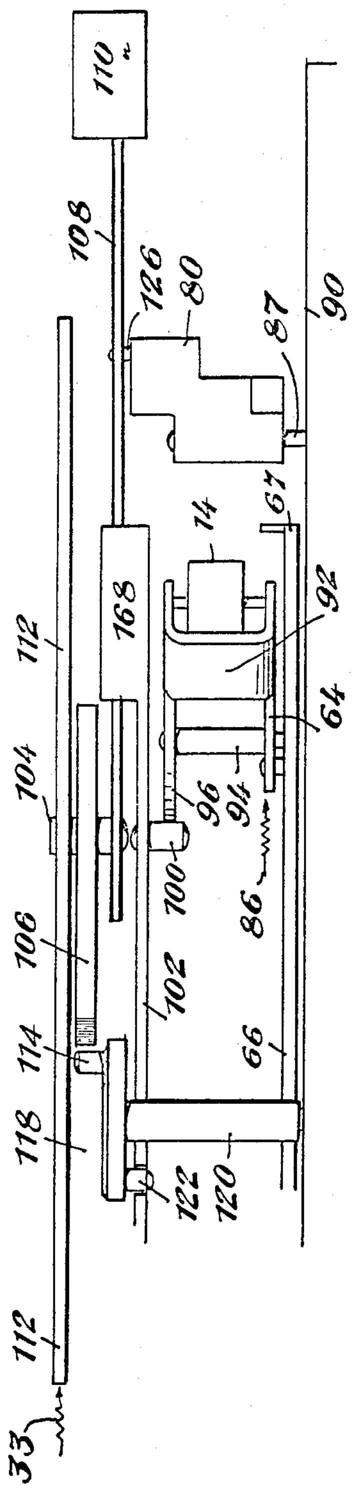
FIG. 8 is an elevational view of the control assembly.
Figure 9:
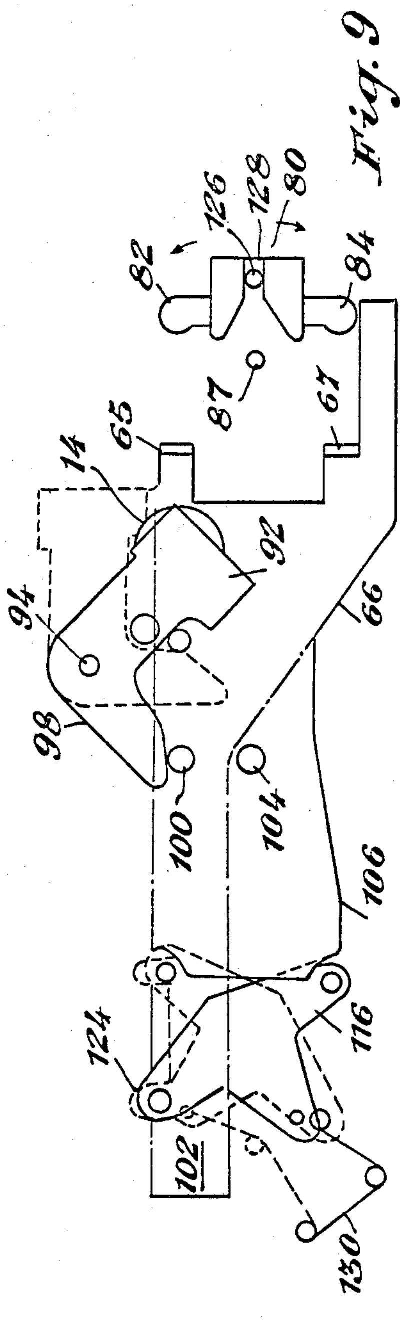
FIG. 9 is a top view, with parts omitted, of said assembly.

FIGS. 8 and 9 show the control assembly. The lugs 65 and 67 of plate 66 are vertical. The magnetic heads are omitted for better clarity, only the mount of the pressure roller is shown. It comprises two bell crank levers rigidly interconnected by a yoke 82 wherein the pressure roller 14 is rotatably mounted. The whole mount swings around the pivot pin 94 fastened to the base plate 90. The bottom lever 64 (FIGS. 5, 6 and 8) is biased by the spring 86 into a counterclockwise rotation.

The interior edge of the top lever 98 is formed into a cam surface 96. This surface co-operates with a downward projecting cam 100 fastened to a horizontally displaceable plate 102 (FIG. 8). A fastener 104 interconnects a plate 112, which is slidable above plate 102, to a pusher element 106 and to an actuator plate 108. In this manner, these two last named components are capable of oscillating with respect to plate 112.

Cam 100 prevents the counterclockwise rotation of the roller mount and thus retains the connection plate 66 and the elements linked to it in the position shown in FIG. 5. To release it into the position of FIG. 6, the actuator 108 is pushed to the left. This movement causes the pusher element 106 to engage a pin 114 on the left end 116 of a two-armed lever 118, which is fulcrumed by its pivot 120 in the base plate 90, and to rotate the lever clockwise, until it is brought into the position indicated by the dotted outline in FIG. 9. As a consequence of this rotation, the pin 122 provided at the end of the other arm of lever 118 and engaging the plate 102 by a slot 124 provided in said plate, will shift it together with its cam 100 to the right. This movement frees top lever 98, and consequently under the action of the spring forces acting upon the bell crank levers, also connecting plate 66 moves to the right, so that its lugs 65 and 67 come within the reach of cams 82 and 84 of fork 80. The position of all elements at this stage has been already discussed with reference to FIG. 6. A spring 33 restores the assembly 106, 112, 108 to its extreme right position. By pushing the actuator again to the left, the element 106 will rotate the lever 118 back into its former position and thus retract plates 102 and 66.

Fork 80 is pivoted at 87 to the base plate 90. A pin 126 depending from actuator 108 is guided within a groove 128 of fork 80. When the actuator 108 is rotated around pin 104 to the right or left, it swings, through pin 126, the fork 80 around its pivot 86, to produce the fast forward or fast rewind speed modes as it has been already explained in connection with the preceding figures.

The very strong spring 130 retains the lever 118 both in the position indicated in full outlines and in the position indicated by dotted outlines.

Figure 10:
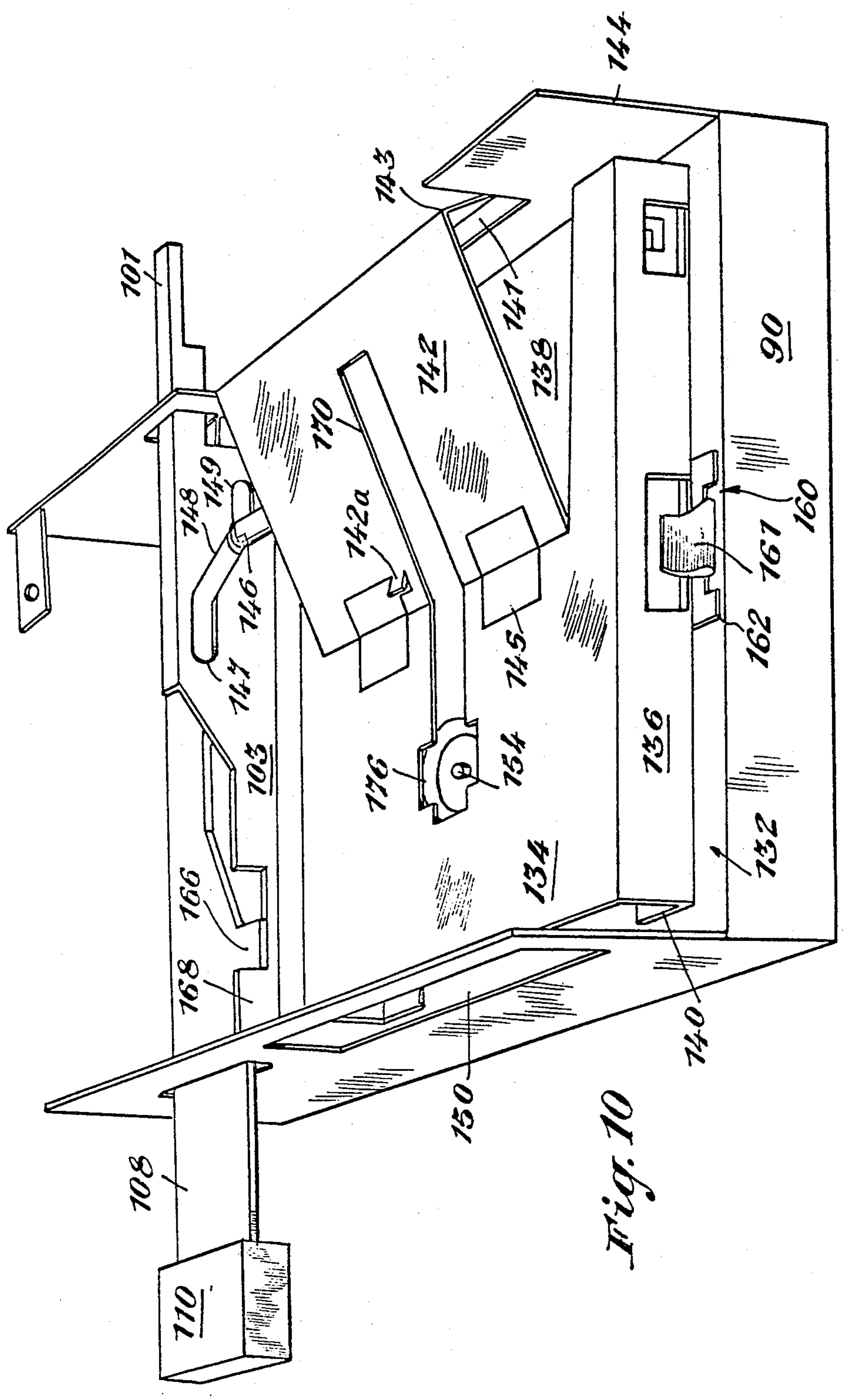
FIG. 10 is a perspective view of the cassette handling assembly of the embodiment.

As it has been already stated, the controls so far described shift the tape transport mechanism from the stop position into the various speed modes. The cassette handling mechanism and its connection with the controls so far set forth will now be illustrated with reference to FIGS. 10 and 11.

Figure 11:
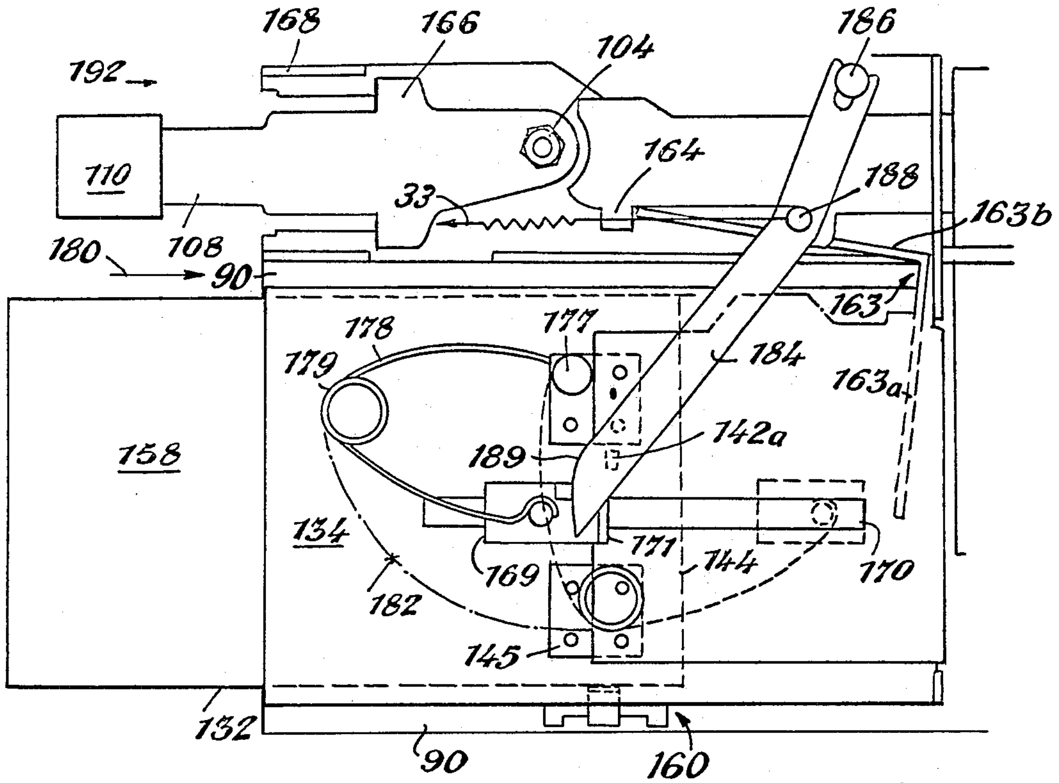
FIG. 11 is a top view thereof.

The generally rectangular cassette-receiving receptacle, generally indicated at 132, is mounted for a vertical movement above the discs 16 and 26 and the cassette registering pins 156. It comprises a top portion 134, from the two sides of which depend L-shaped flanges 136, for guiding and retaining the tape cassette. The top 134 presents a rectangular cut 138 extending from the shorter side, which is opposite to the mouth 140 of receptacle 132, up to approximately the middle of said top. This cut is covered by a link 142 connecting the receptacle to an upright flange 144 of the base plate. Link 142 has the shape of a rectangular plate, whose width approximates that of top 134, and is bent downward at 143 (FIG. 11). A hinge 141 connects this bend 143 to flange 144, while two additional hinges 145 connect the opposite side of link 142 to the top 134. This connection between base 90 and receptacle 132 permits the latter to be lowered and again lifted with respect to the former, but ensures that the receptacle will remain parallel to the base during these movements.

A pin 146 projecting laterally from link 142 is guided within a curved slot 148 provided in an upright flange 103 of plate 102. When the tape playing device is in its inoperative or stop stage, plate 102, as already explained in connection with FIG. 8, is in its left position, pin 146 rests in the upper end 149 of slot 148 and the receptacle mouth 140 is lifted to the level of the entrance opening 150, so that the cassette can be introduced through said opening into said receptacle. When plate 102 and thus its flange 103 is shifted forward to the position represented in FIG. 10, the pin 146 will be depressed into the end portion 149 of slot 148, and the receptacle 132 will descend to its lowermost position, as shown in said figure.

Figure 12:
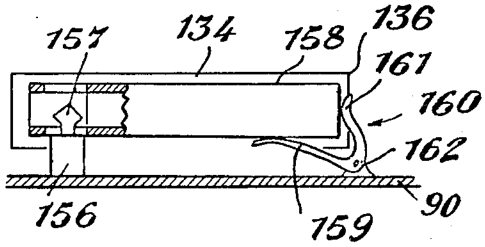
FIG. 12 is a schematic view showing the operation of the cassette positioning unit as viewed from the left side of FIG. 11.

The introduced cassette engages with the bores of its two reel hubs 152 in the spindles 154 of discs 16 and 26 and, with its corresponding holes, in the registering pins 156 provided in the base plate (FIG. 12). While the cassette 158 is thus being lowered, it also depresses the slightly inclined arm 159 of a fork-shaped lever 160 which is hinged at 162 to the base plate 90. Thereby the rotation of the other arm 161 of lever 160 will shift the cassette laterally to the left (as seen in FIG. 12) to engage it beneath the heads 157 of the registering pins 156. Thus the depression of the receptacle brings the cassette accurately into its correct operating position, and this depression is caused by a leftward motion of the actuator 108 and by the consequent rightward shift of the plate 102. However, this operation is hindered until the cassette has sufficiently entered its receptacle and abutted against an arm **163*a* of bell crank lever 163 and thereby rotated the bell crank lever 163 anticlockwise, so that its other arm 163*b* is disengaged from the stop 164 projecting from plate 112. Only when plate 102 is in its left position shown in FIG. 10, the two lateral lugs 166 of actuator plate 108 are left free by the lateral flanges 168 of plate 102, so that this actuator plate can pivot to the right and left around pivot 104**.

Figure 13:
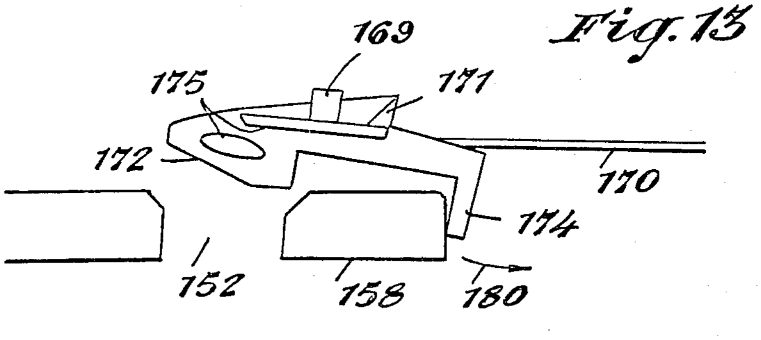
FIG. 13 is a view of a component of the cassette handling unit.

The arrangement, by which the cassette is drawn into the receptacle is shown in FIGS. 11 and 13.

The receptacle top 134 presents a longitudinal slot 170, which extends into the link 142. Within this slot is guided a slide 169. As shown in FIG. 13, its left end forms a shoe 172 and its right end an abutment 174. Before the cassette is introduced into the receptacle, the slide lies in a widening 176 of slot 170, with its projections 175 disengaged form the slot edges. Under the action of a spring 178, the slide 170 is therefore slightly inclined when lying in this widening 176.

When a cassette 158 is introduced into the receptacle, in the direction of arrow 180, its front end will strike the abutment 174, lift it and consequently engage shoe 172 in the reel hub bore 152 of said cassette.

One leg of a spring 178 is pivotable around a fulcrum 177 provided on the top 134, while the other leg is rotatably engaged in a projection of the slide 169, as shown in FIG. 11. The introduction of the cassette and the consequent rightward movement of the slide will impress to the helix 179 of spring 178 a rotation around point 177. Upon reaching approximately a point 182 of its arcuate path (indicated by the dotted curve) this spring snaps automatically into its final position indicated by a dotted line, and the slide 169 slips the cassette completely into the receptacle. The slide ejector (FIG. 11) consists of a blade 184. A slot at one of its ends engages a stationary pin 186. At a point intermediate its ends this blade is pivotably connected at 188 to the plate 112. The already mentioned spring 33, which is applied to said plate at 188, biases the latter and thereby the blade 184 to the position shown in FIG. 11, where its free end 189 is lifted, by a projection **142*a* in the link 142, just above the front 171 of slide 169, when the slide, prior to its contact with the cassette, is inclined forward. Thus, when the cassette 158 is being introduced, the slide slips from under the blade end towards its terminal position at the end of slot 170 until the front end of the cassette actuates lever 162 to disengage lever arm 163*b* from stop 164 thereby enabling movement of actuator 108. Owing to this arrangement, the tap player can be operated only after a cassette has been completely introduced into its receptacle 132**.

When knob 110 of actuator 108 is pressed to the right, in the sense of arrow 192 of FIG. 11, the blade 184 will swing back to the right. At this The rightward displacement of actuator 108 will cause link 142 to be lowered, thereby depressing the receptacle 132 in the cassette carried thereby. The slide 169, which has been entrained by the introduction of cassette 158 to its extreme right position, as shown in dotted lines in FIG. 11, will stay out of reach of the blade end 189. The depression of the receptacle and the consequent actuation of lever 160 in the manner already described, will position the cassette exactly into its operating position, with its reel arms 152 engaged in spindles 154 and its registering holes in the registering pins 156. At this stage, the tape recorder is in its slow forward mode, from which mode it can also be switched to the fast forward and fast rewind by turning the actuator 108 around its pivot 104, as it has been already described. The successive release of the actuator causes the latter to return to its initial position, together with plate 112, under the bias of spring 33. Consequently, also blade 184 resumes the position shown in FIG. 11.

When the actuator 108 is again pushed to the right, also the blade 183 swings again into the same direction. Link 142 reverts to its horizontal position to lift the receptacle in the cassette therein to the level of opening 150. At this stage, the slide 169, which is completely engaged in slot 170, lies horizontal, with its front 171 lifted above the level of link 142, for the groove defined between projection 175 are engaged in the slot edges. In this position, the blade end 189, being out of engagement with the projection **142*a* lies lower and therefore strikes the slide front 171, pushes it back toward the slot widening 176 and and ejects thereby the cassette into whose reel hub 152 the slide shoe 172 is penetrated with the lifting of receptacle 132**.

Thus, my invention realizes all the objects set forth at the beginning of this disclosure.

What I claim is:

1. A tape transport mechanism for a tape recording device, comprising:

a first cylindrical member carrying a tape take-up reel;

a second cylindrical member carrying a tape pay-out reel;

a fly wheel and idler wheel coupled for rotation in opposite, forward and reverse directions, respectively;

a transmission wheel having a pinion concentrically mounted thereto, said transmission wheel and pinion mounted for pivotal motion into respective simultaneous frictional engagement with said flywheel and said first member to drive the take-up reel in said forward direction at a speed for recording said playback;

a flip-over wheel disposed between the flywheel and the idler wheel; and means for mounting said flip-over wheel for pivotal motion, from a neutral position, into simultaneous frictional engagement with a first wheel couple comprising said flywheel and said first member to drive the take-up reel in said forward direction at a speed faster than said recording speed, and for pivotal motion, from said neutral position, into simultaneous frictional engagement with a second wheel couple comprising said idler wheel and said second member for driving the pay-out reel in said reverse direction at a speed faster than said recording speed, said mounting means including means for allowing motion of said flip-over wheel along the length of its pivotal mount, said flip-over wheel, upon being pivoted into engagement with the rims of either of said wheel couples, moving in a radial direction relative to the pivot point of its pivotal mount until said rims are engaged thereby with an equal force.

2. The transport mechanism of claim 21 wherein said flip-over wheel mounting means comprises:

an elongated support carrying the flip-over wheel at one end and having an elongated slot along the length thereof;

an elongated arm having means for applying forces perpendicular to the elongate axis of the support at a point spaced from the slot and having an aperture therethrough, and a pivot post secured to the base of the recording device and extending through said slot and said aperture.

3. A tape transport mechanism for a tape recording device, comprising:

a first cylindrical member carrying a tape take-up reel;

a second cylindrical member carrying a tape pay-out reel;

a flywheel and idler wheel coupled for rotation in opposite, forward and reverse directions, respectively;

a transmission wheel having a pinion concentrically mounted thereto, said transmission wheel and pinion mounted for pivotal motion into respective simultaneous frictional engagement with said flywheel and said first member to drive the take-up reel in said forward direction at a speed for recording and playback;

a flip-over wheel disposed between the flywheel and the idler wheel and mounted for pivotal motion, from a neutral position, into simultaneous frictional engagement with a first wheel couple comprising said flywheel and said first member to drive the take-up reel in said forward direction at a speed faster than said recording speed, and for pivotal motion, from said neutral position, into simultaneous frictional engagement with a second wheel couple comprising said idler wheel and said second member for driving the pay-out reel in said reverse direction at a speed faster than said recording speed;

a capstan rotating at a constant speed;

a pressure roller mounted for pivotal movement toward, and away from, the capstan for pressing the tape therebetween into engagement with the capstan;

a magnetic head mounted for pivotal movement into, and out of, engagement with the tape, said pivotal mount for the magnetic head including a bell crank lever having an apex and two arms extending therefrom, said magnetic head being carried by one of said arms;

a connecting plate mounted for sliding motion into first and second positions and linked to the pivotal mounts of said magnetic head and said pressure roller to pivot the magnetic head and the pressure roller out of engagement with the magnetic tape when moved to said first position and to pivot said magnetic head and pressure roller into engagement with the tape when moved to said second position;

means for engaging the head carrying arm of said bell crank for limiting its pivotal motion in the direction of tape engagement when the head is properly engaged with the tape; and means associated with said connecting plate for applying a force to the end of the other arm of said bell crank to pivot the head away from the tape when the connecting plate is moved into said second position.

4. The transport mechanism of claim 3 wherein said force applying means comprises a cut in said connecting plate, the end of said force receiving arm being loosely engaged therein to allow relative motion between the end of said arm and said connecting plate.

5. The transport mechanism of claim 3 wherein the end of the head carrying arm is wedge shaped, said engaging means comprising a pin secured to said base and engaging said wedge shaped end to limit both pivotal motion and lateral translation of said magnetic head when engaged with said tape.

6. A tape transport mechanism for a tape recording device, comprising:

a first cylindrical member carrying a tape take-up reel;

a second cylindrical member carrying a tape pay-out reel;

a flywheel and idler wheel coupled for rotation in opposite, forward and reverse directions, respectively;

a transmission wheel having a pinion concentrically mounted thereto, said transmission wheel and pinion mounted for pivotal motion into respective simultaneous frictional engagement with said flywheel and said first member to drive the take-up reel in said forward direction at a speed for recording and playback;

a flip-over wheel disposed between the flywheel and the idler wheel and mounted for pivotal motion, from a neutral position, into simultaneous frictional engagement with a first wheel coupled comprising said flywheel and said first member to drive the take-up reel in said forward direction at a speed faster than said recording speed, and for pivotal motion, from said neutral position, into simultaneous frictional engagement with a second wheel couple comprising said idler wheel and said second member for driving the pay-out reel in said reverse direction at a speed faster than said recording speed;

a capstan rotating at a constant speed;

a pressure roller mounted for pivotal movement toward, and away from, the capstan for pressing the tape therebetween into engagement with the capstan;

a magnetic head mounted for pivotal movement into, and out of, engagement with the tape; and a connecting plate mounted for sliding motion into first and second positions and linked to the pivotal mounts of said magnetic head and said pressure roller to pivot the magnetic head and the pressure roller out of engagement with the magnetic tape when moved to said first position and to pivot said magnetic head and pressure roller into engagement with the tape when moved to said second position, said plate, upon being moved into said first position, engaging the pivotal mount of said transmission wheel to pivot the transmission wheel and pinion out of respective engagement with said flywheel and said first member.

7. A tape transport mechanism for a tape recording device, comprising:

first and second wheel couples;

a flip-over wheel disposed between said wheel couples;

means for mounting said flip-over wheel for alternate pivotal motion and radial motion relative to the axis of pivoting for selective equalized-force engagement with said wheel couples to respectively drive said tape in first and second directions;

a capstan rotating at a constant speed;

a pressure roller mounted for pivotal movement toward, and away from, the capstan for pressing the tape therebetween into engagement with the capstan;

a magnetic head mounted for pivotal movement into, and out of, engagement with the tape;

a connecting plate mounted for sliding motion into first and second positions and linked to the pivotal mounts of said magnetic head and said pressure roller to pivot the magnetic head and the pressure roller out of engagement with the magnetic tape when moved to said first position and to pivot said magnetic head and pressure roller into engagement with the tape when moved to said second position;

a control member mounted for pivotal motion, a portion of said member, upon being pivoted, engaging said plate when it is in the second position to shift the connecting plate to said first position; and means connecting said control member with the pivotal mount of said flip-over wheel, pivotal movement of said control member in said first and second directions pivoting said flip-over wheel respectively into engagement with said first and second wheel couples.

8. A tape transport mechanism for a tape recording device, comprising:

a first cylindrical member carrying a tape take-up reel;

a second cylindrical member carrying a tape pay-out reel;

a flywheel and idler wheel coupled for rotation in opposite, forward and reverse directions, respectively;

a transmission wheel having a pinion concentrically mounted thereto, said transmission wheel and pinion mounted for pivotal motion into respective simultaneous frictional engagement with said flywheel and said first member to drive the take-up reel in said forward direction at a speed for recording and playback;

a flip-over wheel disposed between the flywheel and the idler wheel and mounted for pivotal motion, from a neutral position, into simultaneous frictional engagement with a first wheel couple comprising said flywheel and said first member to drive the take-up reel in said forward direction at a speed faster than said recording speed, and for pivotal motion, from said neutral position, into simultaneous frictional engagement with a second wheel couple comprising said idler wheel and said second member for driving the pay-out reel in said reverse direction at a speed faster than said recording speed;

a capstan rotating at a constant speed;

a pressure roller mounted for pivotal movement toward, and away from, the capstan for pressing the tape therebetween into engagement with the capstan;

a magnetic head mounted for pivotal movement into, and out of, engagement with the tape;

a connecting plate mounted for sliding motion into first and second positions and linked to the pivotal mounts of said magnetic head and said pressure roller to pivot the magnetic head and the pressure roller out of engagement with the magnetic tape when moved to said first position and to pivot said magnetic head and pressure roller into engagement with the tape when moved to said second position;

a spring for biasing said connecting plate toward the second position, and stop means for retaining it in the first position, said stop means comprising a plate having a pin secured thereto, said plate being movable from a retracted position, corresponding to said first position of the connecting plate, in which the pin engages a cam surface of the pivotal mount of said pressure roller to retain said connecting plate in said first position, to a forward position, corresponding to the second position of said connecting plate, in which the pin releases said cam surface and connecting plate for movement toward said second position;

a tape cassette receptacle mounted for vertical translatory movement with respect to the base;

a guide slot within said pin carrying plate; and a pin projecting from said receptacle and guided within the slot to vertically move said receptacle toward the base when the pin carrying plate shifts from its retracted to its forward position.

9. The transport mechanism of claim 8 including a slot extending through part of the receptacle and prolonged into part of the mount thereof, a slide movable within the slot and comprising an abutment engaging the front end of a cassette introduced into the receptacle and a shoe engaging a reel hub bore of the cassette, a spring means for retaining said slide in the slot end adjacent the entrance spring of the receptacle and urging said slide and a cassette engaged thereto by said shoe toward the opposite slot end to completely draw said cassette into the receptacle, and a forked lever means hinged to the base plate and engaging the cassette to insert it below the heads of the registering pins of said device when the downward motion of said cassette receptacle inserted therein depresses one arm of said forward lever.

10. The transport mechanism of claim 9 including a pusher arm for alternately engaging either arm of said lever to respectively shift said plate into either position, a flange carried by said plate having a slot for guiding said receptacle and an actuator means pivotally connected to the said pusher means and flange carrying plate for applying a conjoining movement thereto.

11. The transport mechanism of claim 10 wherein said actuator means upon being pivoted engages said fork to rotate it about its pivot.

12. The transport mechanism of claim 10 including an ejector blade linked to the actuator means to swing from a first point, overlying the slide when said slide is in a position adjacent the mouth of the casette receptacle, to a second point behind the terminal position of said slide, said blade being spring biased to return to said first point, said blade being positioned to slide over the receptacle top when said receptacle is in its upper position and to entrain the slide projecting over said top during the return swing to said first point.

* * * * *

PO-1050
(5/69)

UNITED STATES PATENT OFFICE
CERTIFICATE OF CORRECTION

Patent No. 3,669,455 Dated June 13, 1972

Inventor(s) Rodolfo Cicatelli

It is certified that error appears in the above-identified patent and that said Letters Patent are hereby corrected as shown below:

Correct the spelling of the name of assignee from "Antovox S.p.A." to "Autovox S.p.A."

Signed and sealed this 24th day of October 1972.

(SEAL)
Attest:

EDWARD M.FLETCHER,JR.
Attesting Officer

ROBERT GOTTSCHALK
Commissioner of Patents